Feb. 10, 1959
S. J. POPEIL
2,872,958
FOOD CHOPPER
Filed July 16, 1957
2 Sheets-Sheet 1
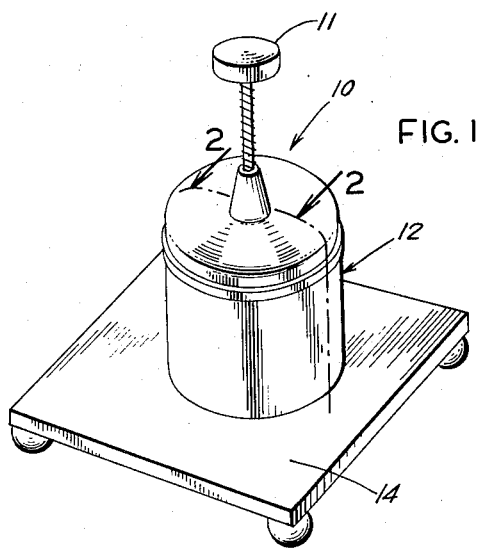
FIG. 1
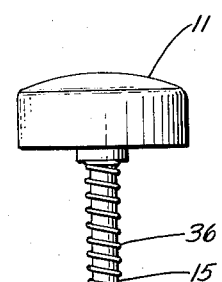
FIG. 2
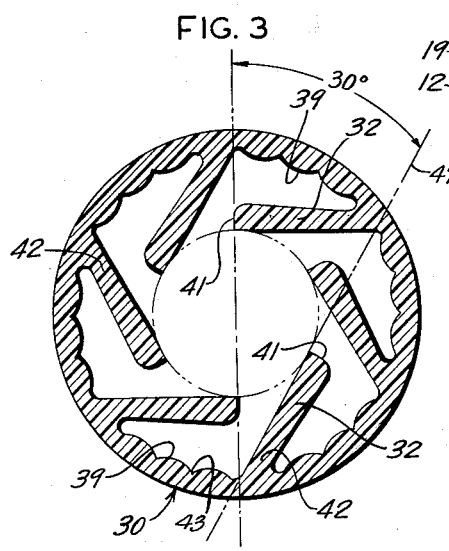
FIG. 3
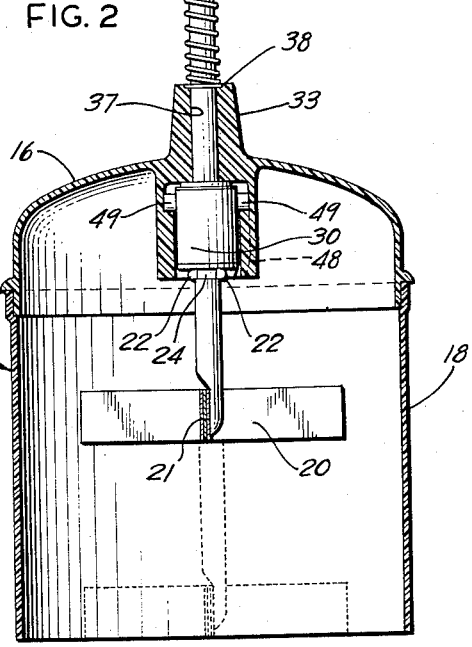
INVENTOR.
SAMUEL J. POPEIL
BY
ATTORNEY Feb. 10, 1959  S. J. POPEIL  2,872,958
FOOD CHOPPER
Filed July 16, 1957  2 Sheets-Sheet 2
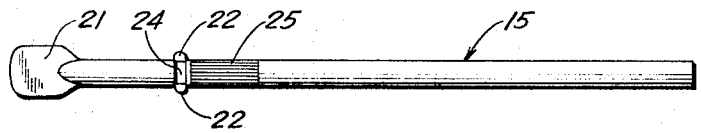
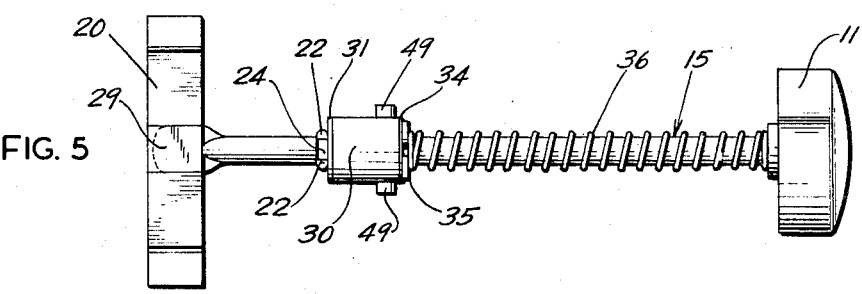
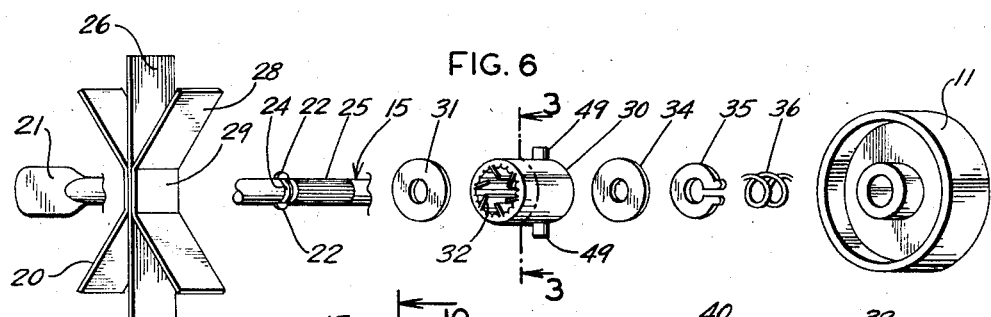
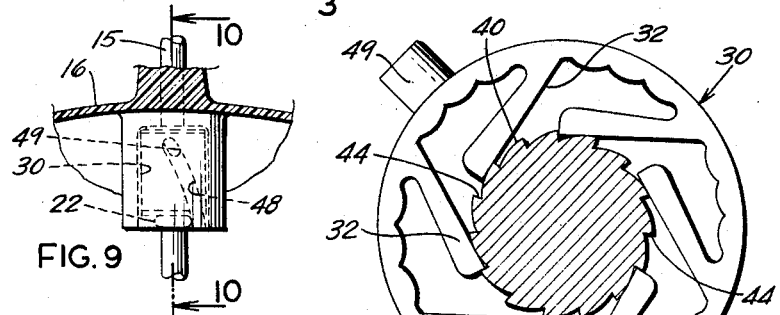
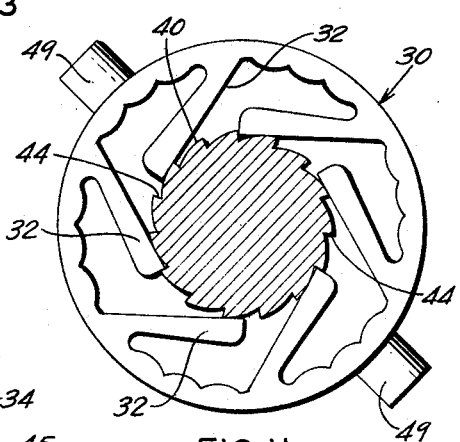
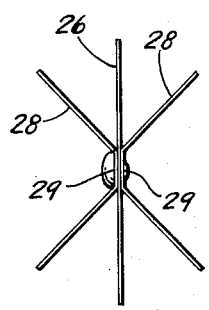
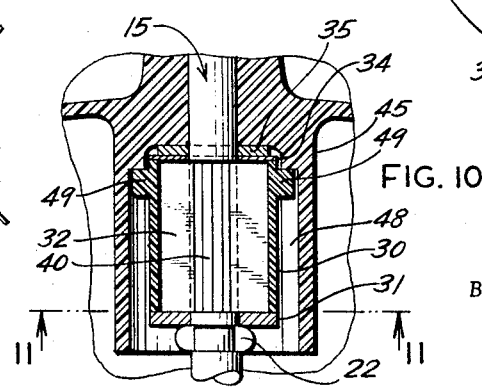
INVENTOR.
SAMUEL J. POPEIL
BY
ATTORNEY United States Patent Office 2,872,958
Patented Feb. 10, 1959

2,872,958
FOOD CHOPPER
Samuel J. Popeil, Chicago, Ill.
Application July 16, 1957, Serial No. 672,206
5 Claims. (Cl. 146—160)

The present invention relates to food choppers, and more particularly to that type of chopper in which the blades rotate within a predictable range, thereby effecting a random indexing with each stroke. Such food choppers are normally used with various vegetables and meat items which are placed on a chopping board or other flat surface and subsequently comminuted upon repetitive striking by the blades.

It is the general object of the present invention to provide a food chopper which has a large capacity, excellent operating characteristics, and can be manufactured at the irreducible minimum cost commensurate with the quality of the product and its performance.

A more detailed object of the invention is to furnish a food chopper with a predictable range of random indexing in the order of eight to fifteen strokes which will rotate the blade assembly 360°.

Another advantage achieved by the invention is the low steel content of the blades without any substantial reduction in the effective chopping. Indeed, a further advantage accrues through the employment of the invention by providing for uniform chopping of the food throughout the entire beaten zone, including the center of impact.

Another object of the invention is to impart a dynamic self-stripping action to the blades, thereby achieving the two-fold advantage of eliminating a physical stripper mechanism and rendering the food chopper easier to clean and reassemble.

Still another object of the invention is to provide a food chopper which achieves the foregoing advantages and in addition embodies a blade construction which admits of easier resharpening.

A further advantage flows from the present invention because the majority of the principal metal forming operations are all performed on a single central shaft.

Yet another object of the invention is to reduce the number of parts and consequently assembly operations required for a random indexing food chopper while at the same time permitting greater dimensional tolerances; the foregoing all contributing to an ultimate reduction in manufacturing cost.

Further objects and advantages of the present invention will become apparent as the following description of an illustrative embodiment proceeds, taken in conjunction with the accompanying illustrative drawings, in which:

Figure 1 is a perspective view of the illustrative food chopper on a chopping board, showing its general orientation and environment for use.

Fig. 2 is an enlarged partial sectional view of the food chopper shown in Fig. 1 taken along section line 2—2 of Fig. 1.

Fig. 3 is an enlarged sectional view of the clutch sleeve member taken in transverse section along section line 3—3 of Fig. 6.

Fig. 4 is a front elevation of the reciprocating shaft.

Fig. 5 is a front elevation of the reciprocating shaft assembly including the blades, clutch and handle.

Fig. 6 is a perspective exploded view of the blade assembly illustrated in Fig. 5.

Fig. 7 is an end view taken from the left end of the shaft as shown in Fig. 4.

Fig. 8 is an end view of the shaft assembly shown in Fig. 5 taken from the left end of Fig. 5 but not showing the clutch and handle portions of the shaft assembly.

Fig. 9 is an enlarged broken partial section of the clutch assembly and upper housing shown in Fig. 2 illustrating the clutch in its housing in phantom lines.

Fig. 10 is a further enlarged sectional view of the clutch assembly and housing taken along section line 10—10 of Fig. 9.

Fig. 11 is an enlarged end view of the clutch sleeve assembly illustrating its relationship with the toothed portion of the shaft and is taken along section line 11—11 of Fig. 10.

In broad outline the invention contemplates a unique blade and clutch construction all of which cooperate with a unique shaft to achieve the objects and advantages outlined above and which will be detailed hereinafter.

In order to more fully appreciate the invention, its environmental structure and typical usage should first be pointed out. Referring now to Fig. 1, it will be seen that the illustrative food chopper 10 having a chopping handle 11 and housing 12, is placed atop a chopping board 14. Foods such as potatoes, onions, nut meats and the like are placed beneath the housing 12, and then the user, by repeatedly striking the handle 11, depresses the shaft 15 and its associated blade assembly to repeatedly cut the food within the housing 12. As the blade assembly rotates the food is finely divided to a degree proportionate to the number of strokes the operator employs to strike the handle 11. After operating, the housing top 16, as shown in Fig. 2, is then separated from the cylindrical bottom 18 at the overlapping friction fit 19. The top and its associated blade assembly 20 are then washed, preferably in a stream of hot tap water, and the bottom cylindrical portion 18 of the housing is also similarly washed.

The backbone of the entire structure is the shaft 15 shown in front elevation in Fig. 4. In a successful commercial unit the shaft is made of a 5/16 bar of steel which is plated after being formed. As will be seen, the lower end of the shaft has been formed, as by forging, to provide a flat 21 to which the blade assembly 20 can be attached as by welding or other fastening means. Farther up the shaft, a pair of washer supports 22 are formed by an upset forging which leaves a recessed channel 24 from which the metal formed into the washer supports 22 is taken. Above the washer supports 22 is a band of teeth 25 formed onto the shaft 15 preferably by knurling type operation. The detailed construction of the teeth will be described later.

Referring now to Figs. 5 and 6 the assembled relationship of the component parts will be better understood. The blade assembly 20 is, as shown in Fig. 8, made up of three separate metal stampings, a central blade portion 26 and two outer blade portions 28. The outer blade portions 28 are formed with a flat center section 29 which is proportioned to abut against the flat 21 on the base of the shaft 15. In this position the blade assembly and shaft 15 can be conveniently held by means of a fixture while the blade assembly is spot-welded to the shaft. Thereafter a clutch sleeve base mounting washer 31 of a diameter approximating that of the clutch sleeve 30 is slipped onto the shaft and abuts against the clutch sleeve washer supports 22. In this position, the clutch sleeve 30 overlaps the band of teeth 25, the clutch sleeve fins 32 engaging the teeth 25 in a manner to be described in detail later. A second clutch sleeve washer 34 abuts the upper end of the clutch sleeve 30 and is secured in place to lock the clutch sleeve 30 against axial movement by means of a lock ring 35. The coil spring 36 abuts a shoulder 43 (see Fig. 2) in the upper portion of the top 16 of the housing, thereby providing for the reciprocating motion of the shaft and its related parts after being manually depressed.

Referring now to Fig. 11, it will be seen that the clutch sleeve 30 is tubular in cross section and has a plurality of internally formed integral fins 32 which are foreshortened cords of the transverse circular section of the sleeve 30.

Referring now to Fig. 3, it will be seen that a scalloped effect is created on the inside of the clutch sleeve 30 by means of the scallops 39, three of which being provided between the fins 32. The scallops 39 add additional strength and body to the clutch sleeve 30 while still defining thin wall sections at the lands 38 to permit the necessary wall flexing which results in the unique overrunning clutch relationship established between the clutch sleeve 30 and the shaft teeth 40. It should also be noted that the circle with which the fins 32 form a common tangent is of a diameter approximating that of the root diameter of the teeth 40. In a successful commercial unit where the 5/16 inch or .312 inch dimension is employed, this root diameter is .290 inch with a crown dimension across the teeth of .330. This results in approximately 30° of angle between each fin 32 and its associated diameter extending from its base. The further geometric relationship of extended tangents 47 meeting the alternate bases of the fins will be similarly apparent upon review of Fig. 3.

In order to insure a linearity of deflection, it is required that the fin 32 bend with a relatively constant deflection throughout its entire length. This is accomplished by tapering the fin with its tooth engaging end 41 thicker than the fin base 42. In a commercial unit sleeve 30 having an O. D. of .625 inch, the fin taper of .045 inch to .030 inch has been found satisfactory. The result is to provide a firmer locking action between the end 41 of the fin 32 and the locking face 44 of the teeth 40.

To effectuate the indexing, it is necessary that the clutch sleeve 30 be rotated at the upper portion of the stroke of the shaft 15. This rotation is accomplished by providing an internally threaded clutch cylinder at the upper portion of the housing top 16. Within the clutch cylinder 45 are provided a plurality of helically formed grooves 48 which coact with the clutch sleeve projections 49 to rotate the clutch sleeve 30 at the upper portion of the return stroke as well as the early portion of the downstroke.

The shaft 15 is journaled for reciprocating random rotation within the housing sleeve 33 which has a central bore 37. Because this is the only support for the shaft 15, it has been found desirable to have the length of the bore 37 approximately 2½ times the diameter of the shaft. For example, in a commercial embodiment, the shaft diameter is 5/16 inch and the length of the bore 37 is approximately ¾ inch.

The clutch assembly is compact, sturdy, and easily manufactured as illustrated in Fig. 10. It will be seen that the clutch sleeve support tabs 22 hold the clutch sleeve support washer 31 in an axially immobilized position. The clutch sleeve 30 orients itself axially by the contact of the fins 32 with the teeth 40 on the shaft 15. A second clutch sleeve washer 34 caps the clutch sleeve 30, and is securely held in place by means of the snap ring 35.

In review it will be seen that there has been disclosed and described a unique type food chopper with a clutch mechanism providing a random indexing during the latter portion of the upstrike of the unit. When the clutch sleeve 30 is molded from nylon or other plastic with similar characteristics it has been found to prove extremely reliable in operation over long periods of use. One commercial embodiment was rotated a quarter million turns on a drill press with the fins 32 in constant engagement with the tooth band 25, and was subsequently reassembled and found to operate with no detectable difference from the operation observed prior to the test. In addition, a single central shaft is employed to orient all of the metallic elements of the unit, thereby substantially eliminating many difficult manufacturing operations. The configuration of the blade assembly 20 permits substantial coverage of the beaten zone and yet employs an irreducible minimum of blade material. Further, because of the snap action indexing on the return stroke and particular construction of the blades, the food chopper blade assembly 20 effects a dynamic stripping operation, thereby eliminating the necessity of a separate independent stripper unit to clean the blades from excessive foodstuffs. Long life is imparted to the clutch by proportioning the sleeve 30 to flex principally in the walls rather than the fins, as if the walls are relatively heavy, rotation will unduly wear the fins 32.

Although particular embodiments of the invention have been shown and described in full here, there is no intention to thereby limit the invention to the details of such embodiments. On the contrary, the intention is to cover all modifications, alternative embodiments, usages and equivalents of the food chopper construction as fall within the spirit and scope of the invention, specification, and appended claims.

I claim as my invention:

1. In a food chopper having a reciprocating shaft with chopping blades at one end of the shaft and a housing which journals the shaft for reciprocation, a random indexing mechanism comprising in combination, a cylindrical sleeve, said sleeve having inwardly integral extending uniform fins said fins forming a plane parallel with the sleeve axis, a plurality of teeth on the shaft aligned axially along the shaft; the sleeve fins, and teeth being proportioned and oriented for contact between the teeth and fins to provide overrunning action in one direction and locking engagement in the other when the sleeve is rotated with respect to the shaft; and co-operating means on the housing and the sleeve for imparting a rotational motion to the sleeve with respect to the reciprocating shaft at the fore-portion of the shaft downstroke.

2. In a food chopper having a reciprocating shaft with chopping blades at one end of the shaft and a housing which journals the shaft for reciprocation, a random indexing mechanism comprising in combination, a cylindrical sleeve having inwardly extending integral fins uniformly non-radially oriented in planes parallel with the sleeve axis, a plurality of teeth on the shaft aligned axially along the shaft, the sleeve fins being proportioned for yieldable contact with the shaft teeth, and co-operating means on the housing and the sleeve for imparting a rotational motion to the sleeve relative to the reciprocating shaft at the fore-portion of the shaft downstroke.

3. A food chopper of the character defined in claim 2 above in which the fins are tapered to narrow between the fin ends and the junction of the fins with the sleeve to effect a linear deflection of the fins.

4. A food chopper of the character defined in claim 2 above in which the sleeve has a cylindrical wall, the inner face of the wall being scalloped thereby defining lands which serve as deflection points when the wall flexes due to the tooth bending force applied to the fins.

5. In a food chopper having a reciprocating shaft with chopping blades at one end of the shaft and a housing which journals the shaft for reciprocation, a random indexing mechanism comprising in combination, a cylindrical nylon sleeve having inwardly integral extending fins, a plurality of teeth on the shaft, the fins being proportioned to yieldably engage the teeth, the fins and sleeve walls being proportioned for a joint flexing action thereby distributing the deflection over the entire nylon mass, and co-operating means on the housing and the sleeve for imparting a rotational motion to the sleeve with relation to the reciprocating shaft at the fore-portion of the shaft downstroke.

References Cited in the file of this patent

UNITED STATES PATENTS

| | | |
|---|---|---|
| 887,423 | Pratt | May 12, 1908 |
| 2,140,010 | Hanel | Dec. 13, 1938 |
| 2,526,239 | Kincaid | Oct. 17, 1950 |
| 2,787,308 | Popeil | Apr. 2, 1957 |

FOREIGN PATENTS

| | | |
|---|---|---|
| 464,465 | Italy | July 4, 1951 |